March 9, 1965  J. R. ERWIN  3,172,621
AIRFOIL
Filed July 10, 1963
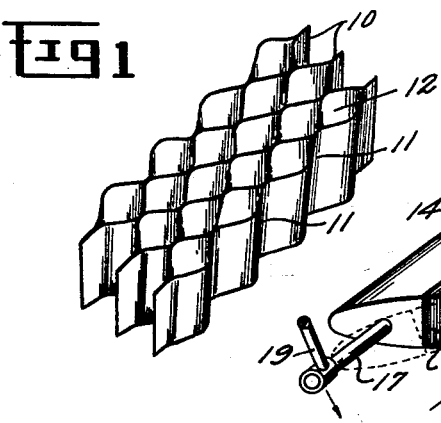
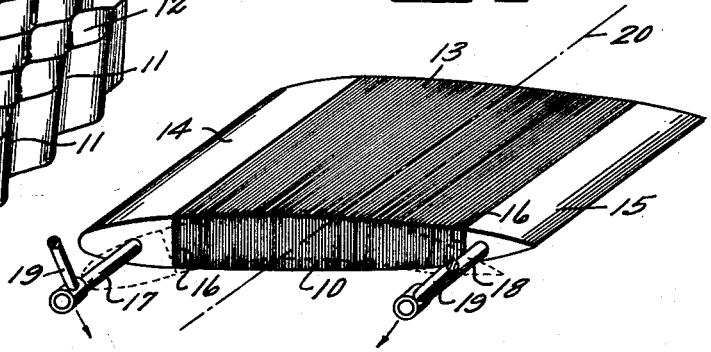
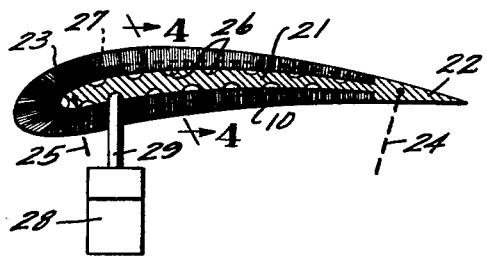
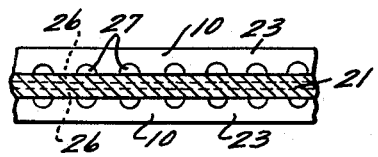
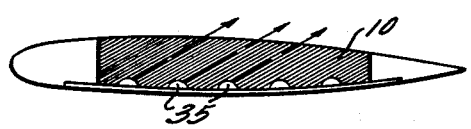
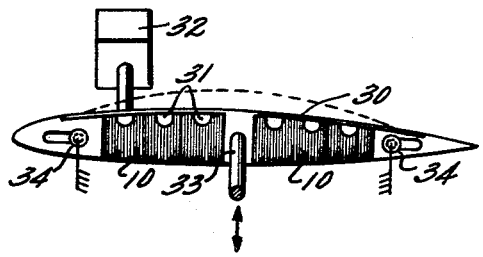
INVENTOR.
JOHN R. ERWIN
BY John F. Cullen
ATTORNEY United States Patent Office 3,172,621
Patented Mar. 9, 1965

3,172,621
AIRFOIL
John R. Erwin, Wyoming, Ohio, assignor to General
Electric Company, a corporation of New York
Filed July 10, 1963, Ser. No. 294,049
11 Claims. (Cl. 244—44)

This invention relates to an airfoil and, more particularly, to a variable camber airfoil which also lends itself to boundary layer control and/or transpiration cooling.

There are many components in lift and propulsion systems wherein variable camber airfoils are of considerable practical value. Such applications include inlet and exit louver vanes for lift fans, inlet guide vanes and stators in compressors, and nozzles and stators in turbines. Variable camber airfoils have been used in aircraft wings in the form of flaps for a long time but the blading in turbomachinery is generally so small that the usual airfoil type flap would necessarily be so small that its construction and actuation would be difficult and expensive to accomplish accurately. A number of variable camber airfoils have been made available and these generally include some flexible elements, such as plastic or rubber, in the main body of the airfoil as in U.S. Patent 2,226,- 978. Additionally, metallic elements cemented on such rubber-like material have been proposed as shown in U.S. Patent 2,588,570 and metallic elements alone that may be bent in order to change the camber are known as in U.S. Patent 3,042,371. Additionally, some airfoils have used nested series arrangements that may be bent about different spanwise axes to change the camber as in U.S. Patent 2,585,871. Many materials have been proposed for the body of the airfoil to provide the flexibility necessary for changing the camber of the airfoil and all have had their disadvantages generally in the area of being difficult to operate, insufficient for high temperature applications, and in the case of a rubber-like center portion of the airfoil, having a wrinkled and therefore non-smooth aerodynamic surface when the camber is changed.

The main object of the present invention is to provide an airfoil whose camber may be varied while still providing a smooth aerodynamic surface.

Another object is to provide such an airfoil that avoids complex structure and actuation mechanism in order to change its camber.

A further object is to provide such an airfoil that, in addition to lending itself to a smooth aerodynamic surface having variable camber characteristics, also permits boundary layer control and/or transpiration cooling by reason of its unique structure.

Briefly stated, the airfoil whose camber may be varied, comprises a plurality of stacked, thin flexible sheets aligned and extending spanwise of the airfoil. Each sheet is joined to its adjacent sheet along spaced seams and the seams are alternately staggered on adjacent sheets to form a compressed honeycomb structure. A solid structural means is extended spanwise and the honeycomb is bonded to the structural means. Means are connected to the structural means to rotate the latter relative to and on opposite sides of a spanwise axis to vary the camber of the airfoil by flexing and differential displacement of the stacked sheets. Additionally, suitable grooves may be provided centrally within the airfoil through which fluid may be moved to suck the boundary layer off the surface of the airfoil, energize the boundary layer on the surface of the airfoil, or to provide transpiration cooling for the airfoil.

While the specification concludes with claims particularly pointing out and distinctly claiming the subject matter which is regarded as the invention, it is believed the invention will be better understood from the following description taken in connection with the accompanying drawing in which:

FIG. 1 is a partial perspective view of the stacked sheet structure forming the honeycomb material;
FIG. 2 is a partial perspective view of an airfoil showing means to vary the camber;
FIG. 3 is a cross-sectional view of an alternate form of airfoil having means for passing fluid through the airfoil;
FIG. 4 is a cross-sectional view on line 4—4 of FIG. 3;
FIG. 5 is a cross-sectional view of a modified form of airfoil showing an alternate means of varying the camber; and
FIG. 6 is a view of an alternate form of airfoil with a different alignment of the stacked sheets.

The invention will best be understood by referring first to FIG. 1 where there is shown the expanded form of a conventional honeycomb structure. In this figure a plurality of stacked thin flexible sheets 10 are aligned, preferably vertically as shown, and extend in the spanwise direction for the airfoil to be described. While not necessary, for strength purposes and high temperature applications, it is preferable that the sheets be metallic sheets such as aluminum or stainless steel although not limited to these materials. In order to provide the well known honeycomb structure as shown for example in FIG. 3 of U.S. Patent 2,734,586, each sheet 10 is joined to its adjacent sheet along spaced seams 11 in the normal manner. With aluminum sheets the seams 11, which are vertical as shown in FIG. 1, may be bonded by any suitable adhesive, such as epoxy, well known in the art. The seams may be welded or brazed in the case of stainless steel. In order to provide the flexibility necessary, the seams are alternately staggered as at 12 on adjacent sheets. This structure is well known and is conventional honeycomb material. Normally, it is expanded or pulled apart as shown in FIG. 3 of the referenced patent to form an extremely strong and lightweight structure.

In the instant invention, however, it is desired to use this structure in a different form from that intended for usual honeycomb "sandwich" construction. To this end, the honeycomb is pressed together tightly relative to normal honeycomb to form a plurality of closely stacked sheets and such structure is shown in FIG. 2. When the honeycomb is thus pressed together, it forms almost a solid metallic object as compared to normal honeycomb and may be machined in much the manner of a solid metal bar. However, in this compressed position it is extremely flexible in a direction at right angles to the plane of alignment of its sheets and strongly resists any deflection in other directions.

In order to use this unexpanded or compressed stacked sheet structure in an airfoil, the structure as shown in FIG. 2 is provided. In this figure the closely pressed or stacked flexible sheets 13 form the main body of the airfoil. It will be noted that the sheets are aligned spanwise of the partial airfoil shown and this is necessary in order to vary the camber. As shown in FIG. 2, solid structural means consisting of a pair of support members forming a leading edge 14 and a trailing edge 15 are provided and these extend spanwise of the airfoil. To provide a unitary structure the compressed honeycomb is bonded by any suitable means to these leading and trailing edge support members along bonding surface 16. The camber of the airfoil is varied by providing suitable means 17 and 18 connected to the leading and trailing edges, respectively, and operable by any suitable linkage 19 to rotate or move means 17 and/or 18. The individual sheets of the stacked sheets 13 are flexed and differentially displaced upon movement of linkage 19 and tend to rotate relative to and on opposite sides of a spanwise axis 20 to vary the camber of the airfoil. Because of the closely stacked sheets and their thinness, approximately 1 mil each, the airfoil changes its camber to provide a smooth aerodynamic surface. For example, even a hundred percent expansion of the space between the individual sheets provides only a one mil opening. In other words, the displacement of the stacked sheets provides smooth aerodynamic surfaces and even the concave side of the airfoil is smooth without wrinkles since the sheets are not displaced on that surface. Any air flow through the stacked sheets may be restricted or prevented depending on the spacing of the stacked sheets.

Referring next to FIG. 3, a modified form of airfoil is shown wherein a single continuous structural means 21 may be provided and this member may be flexible itself. For purposes of illustration, its thickness, which may be substantially no more than a plate, is shown exaggerated in FIG. 3. Means 21 is provided at least with a trailing edge 22. In this case the structural means 21 extends both chordwise and spanwise of the airfoil to provide a center portion, a leading edge support and preferably the trailing edge itself of the airfoil. For flexibility and varying of the camber, the compressed honeycomb material 23 may be bonded to the remaining part of or the surfaces of structural means 21 as shown. Any suitable linkage 24 and 25 may be provided on the trailing edge 22 and the forward portion of means 21, respectively, for actuation to vary the camber of the airfoil. This figure also illustrates structure by which the airfoil may be cooled or may have its boundary layer controlled. Spaced parallel grooves 26 in the structural member are provided for moving fluid through the airfoil. These grooves are formed at the bonding surface between the compressed honeycomb and the structural means and they extend completely around the structural means as shown. Additionally, to provide a complete flow of fluid, a second set of spaced parallel grooves 27 is provided in the inner surface of the compressed honeycomb of stacked sheets and these two sets of grooves intersect one another. Preferably the grooves are at right angles for convenience and ease of manufacture although it will be obvious that this is not a limitation but merely a preferred form.

In order to move fluid through the grooves any suitable means, such as a pump diagrammatically shown at 28, may be provided with a conduit 29 connecting with the groove 26 or the conduit may even be an extension of grooves 26. If it is desired to cool the airfoil, a suitable cooling fluid may be pumped by pump means 28 to seep out between the individual thin sheets 10 for cooling all surfaces of the airfoil by transpiration and film cooling. If it is desired that boundary layer control be provided by energization of the boundary layer, then pump 28 may again be used to provide a moving fluid that is transferred to the airfoil surface and thus the boundary layer on the outer surface of the stacked sheets. For energization by blowing, an alternate slanted arrangement of the sheets is preferred as shown in FIG. 6. If boundary layer control is desired by removal or suction, then pump 28 may be merely a suction pump to suck the boundary layer off the surface of the airfoil and remove it through grooves 27, 26 and conduit 29.

Referring next to FIG. 5, there is shown a modified form of variable camber airfoil. In this figure, which is typical for aluminum compressed honeycomb which may not sufficiently support itself, the structural means may include an additional member consisting of a continuous flexible sheet 30, preferably but not necessarily metallic, which connects the leading and trailing edge support members as shown and this sheet preferably forms the convex outer surface of the airfoil. This structure is preferable for the lightweight aluminum compressed honeycomb whereas the structure shown in FIG. 2 may be self-supporting when stainless steel compressed honeycomb is used and the continuous sheet 30 is not required. The compressed honeycomb is bonded at the edges of its sheets to the inner surface of the continuous sheet and again grooves 31 may be used to provide for the movement of fluid by pump means 32 in much the manner described in FIG. 3.

FIG. 5 also illustrates an additional and more simplified means of actuation wherein a central member 33 may be used to provide the displacement necessary and the leading and trailing edges are held substantially fixed requiring only slight sliding movement and consequent rotation by a suitable means 34. This actuation arrangement requires only one translating or moving means in member 33 rather than a connection to both the leading and trailing edge members as shown in FIGS. 2 and 3.

In the event that energization of the boundary layer is desired for control purposes, it is advantageous to stack the individual sheets 10 in a slanted fashion as shown in FIG. 6. There is a limit to the slanting that may be provided but sufficient angularity is obtainable to provide the flow of fluid as shown by the arrows into the boundary layer to energize the boundary layer. Thus, the flow may exit substantially parallel or tangent to the surface or sufficiently parallel to the surface to provide the energization necessary for boundary layer control. In this FIGURE, a suitable plate bonded to the edges of the sheets on the concave side may be used to provide a wall for suitable grooves 35 for the entry of fluid by any suitable means as previously described in connection with FIGS. 3 and 5. While actuation means may be provided to vary the camber, if only cooling or boundary layer control is desired, it may be omitted. Slanting the sheets into the flow over the airfoil produces recovery of the boundary layer kinetic energy.

It will be apparent that many modifications of the arrangements shown will suffice to provide the flexibility and the smooth aerodynamic surface by using the unique construction described.

The compressed honeycomb or stacked sheet arrangement provides a relatively large variation in camber or transpiration cooling alone or both while still maintaining the smooth aerodynamic surface necessary and, if necessary, the critical aerodynamic surface may be supplied with a continuous sheet as described in FIG. 5 while still maintaining the variable camber feature of the airfoil.

While there have been described preferred forms of the invention, obvious modifications and variations are possible in light of the above teachings. It is therefore to be understood that within the scope of the appended claims, the invention may be practiced otherwise than as specifically described.

I claim:

1. An airfoil whose camber may be varied comprising, a plurality of stacked thin flexible sheets aligned and extending spanwise,
   each sheet being joined to its adjacent sheet along spaced seams and said seams being alternately staggered on adjacent sheets to form a compressed honeycomb,
   structural means providing leading and trailing edge support,
   said compressed honeycomb being bonded to said means.

2. An airfoil as described in claim 1 having rotating means connected to said structural means to rotate said structural means relative to and on opposite sides of a spanwise axis to vary the camber of said airfoil by displacement of said stacked sheets.

3. An airfoil as described in claim 2 wherein the sheets are metallic sheets and are substantially vertically aligned and each sheet is joined to its adjacent sheet along spaced vertical seams.

4. An airfoil as described in claim 3 wherein said structural means comprises leading and trailing edge members on said airfoil and said means for rotating is connected to both said members.

5. An airfoil as described in claim 3 wherein said structural means extends chordwise and spanwise of said airfoil and forms at least the trailing edge, the remaining part of said means forming bonding surfaces, and said compressed honeycomb being bonded to said surfaces of said means.

6. An airfoil as described in claim 4 having a continuous flexible sheet connecting said leading and trailing edge members, said sheet forming the convex outer surface of said airfoil and said compressed honeycomb being bonded at the edges of its sheets to the inner surface of said continuous sheet.

7. An airfoil as described in claim 5 having spaced parallel grooves in said structural means at at least one of said bonding surfaces and having spaced parallel grooves in said honeycomb at said bonding surface extending substantially at right angles to the grooves in said structural means to connect therewith,
and means for moving fluid through said grooves and between said sheets.

8. An airfoil as described in claim 6 having spaced parallel grooves in said honeycomb at said bonding surface,
and means for moving fluid through said grooves and between said sheets.

9. An airfoil whose camber may be varied comprising,
a plurality of stacked thin flexible sheets aligned and extending spanwise,
each sheet being joined to its adjacent sheet along spaced seams and said seams being alternately staggered on adjacent sheets to form a compressed honeycomb,
structural means bonded to said honeycomb and providing leading and trailing edge support,
said sheets being slanted to the direction of fluid flow over the airfoil surface,
and means for moving fluid between said sheets and substantially tangent to the airfoil surface.

10. An airfoil as described in claim 9 wherein the means for moving the fluid causes the fluid to exit in the direction of fluid flow over the airfoil.

11. An airfoil as described in claim 9 wherein said structural means includes a plate bonded to the edges of said sheets connecting the leading and trailing edge support,
and grooves between the sheets and plate for directing fluid to said grooves by said fluid moving means.

References Cited in the file of this patent
UNITED STATES PATENTS

| 1,517,765 | Stout | Dec. 2, 1924 |
| 2,226,978 | Pescara | Dec. 31, 1940 |
| 2,406,499 | Jandasek | Aug. 27, 1946 |
| 2,484,141 | Alex | Oct. 11, 1949 |
| 2,585,871 | Stalker | Feb. 12, 1952 |
| 2,588,570 | Pitcairn | Mar. 11, 1952 |
| 2,734,586 | Wright et al. | Feb. 14, 1956 |
| 2,828,531 | Bath | Apr. 1, 1958 |
| 2,908,455 | Hoadley | Oct. 13, 1959 |
| 3,042,371 | Fanti | July 3, 1962 |
| 3,097,982 | Stoner | July 16, 1963 |

FOREIGN PATENTS

| 720,956 | Great Britain | Dec. 29, 1954 |

OTHER REFERENCES

German printed application, C10110 XI/62c, Oct. 31, 1956.